US008990069B1

(12) United States Patent
Zens et al.

(10) Patent No.: US 8,990,069 B1
(45) Date of Patent: Mar. 24, 2015

(54) TECHNIQUES FOR PRUNING PHRASE TABLES FOR STATISTICAL MACHINE TRANSLATION

(71) Applicant: Google Inc., Mountain View, CA (US)

(72) Inventors: Richard Zens, San Mateo, CA (US); Peng Xu, San Jose, CA (US)

(73) Assignee: Google Inc., Mountain View, CA (US)

( * ) Notice: Subject to any disclaimer, the term of this patent is extended or adjusted under 35 U.S.C. 154(b) by 371 days.

(21) Appl. No.: 13/626,982

(22) Filed: Sep. 26, 2012

Related U.S. Application Data

(60) Provisional application No. 61/666,267, filed on Jun. 29, 2012.

(51) Int. Cl.
*G06F 17/28* (2006.01)
(52) U.S. Cl.
CPC .................................. *G06F 17/284* (2013.01)
USPC .............................................................. 704/4
(58) Field of Classification Search
CPC .................................................. G06F 17/2818
USPC .............................................................. 704/4
See application file for complete search history.

(56) References Cited

U.S. PATENT DOCUMENTS

| | | | | |
|---|---|---|---|---|
| 8,229,728 B2 * | 7/2012 | Huang et al. | ....................... | 704/4 |
| 2009/0240487 A1 * | 9/2009 | Shen et al. | ......................... | 704/9 |
| 2010/0268527 A1 * | 10/2010 | Tomeh et al. | ...................... | 704/4 |
| 2013/0103390 A1 * | 4/2013 | Fujita et al. | ......................... | 704/9 |

OTHER PUBLICATIONS

Zens, Richard, Daisy Stanton, and Peng Xu. "A systematic comparison of phrase table pruning techniques." Proceedings of the 2012 Joint Conference on Empirical Methods in Natural Language Processing and Computational Natural Language Learning. Association for Computational Linguistics, 2012.*

Galbrun, Esther. "Phrase table pruning for statistical machine translation." (2010).*

Chiang, David. "A hierarchical phrase-based model for statistical machine translation." Proceedings of the 43rd Annual Meeting on Association for Computational Linguistics. Association for Computational Linguistics, 2005.*

Yang, Mei, and Jing Zheng. "Toward smaller, faster, and better hierarchical phrase-based SMT." Proceedings of the ACL-IJCNLP 2009 Conference Short Papers. Association for Computational Linguistics, 2009.*

(Continued)

*Primary Examiner* — Shaun Roberts
(74) *Attorney, Agent, or Firm* — Remarck Law Group PLC

(57) ABSTRACT

A computer-implemented technique includes receiving, at a server including one or more processors, a phrase table for statistical machine translation, the phrase table including a plurality of phrase pairs corresponding to one or more pairs of languages. The technique includes determining, at the server, a redundant set of phrase pairs from the plurality of phrase pairs and calculating first and second probabilities for each specific phrase pair of the redundant set. The second probability can be based on third probabilities for sub-phrases of each specific phrase pair. The technique includes determining, at the server, one or more selected phrase pairs based on whether a corresponding second probability for a specific phrase pair is within a probability threshold from its corresponding first probability. The technique also includes removing, at the server, the one or more selected phrase pairs from the phrase table to obtain a modified phrase table.

20 Claims, 3 Drawing Sheets

(56) References Cited

OTHER PUBLICATIONS

Tomeh, Nadi, Nicola Cancedda, and Marc Dymetman. "Complexity-based phrase-table filtering for statistical machine translation." (2009).*

Johnson, John Howard, et al. "Improving translation quality by discarding most of the phrasetable." (2007).*

Chen, Yu, Andreas Eisele, and Martin Kay. "Improving Statistical Machine Translation Efficiency by Triangulation." LREC. 2008.*

Ling, W. et al., "Entropy-based Pruning for Phrase-based Machine Translation," Proceedings of the 2012 Joint Conference on Empirical Methods in Natural Language Processing and Computational Natural Language Learning, pp. 962-971, Jeju Island, Korea, Jul. 12-14, 2012.

* cited by examiner

TECHNIQUES FOR PRUNING PHRASE TABLES FOR STATISTICAL MACHINE TRANSLATION

CROSS-REFERENCE TO RELATED APPLICATIONS

This application claims the benefit of U.S. Provisional Application No. 61/666,267, filed on Jun. 29, 2012. The disclosure of the above application is incorporated herein by reference in its entirety.

FIELD

The present disclosure relates to statistical machine translation and, more particularly, to techniques for pruning phrase tables for statistical machine translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Statistical machine translation generally utilizes statistical models to provide a translation from a source language to a target language. One type of statistical machine translation is phrase-based statistical machine translation. Phrase-based statistical machine translation can map sets of words (phrases) from a source language to a target language using a phrase table. The phrase table can include a plurality of phrase pairs, where each phrase pair includes a phrase in the source language and a phrase in the target language. The phrase table can include a very large number of phrases, which can cause the phrase table to require a substantial amount of computing memory.

SUMMARY

A computer-implemented technique is presented. The technique can include receiving, at a server including one or more processors, a phrase table for statistical machine translation, the phrase table including a plurality of phrase pairs corresponding to one or more pairs of languages. The technique can include determining, at the server, a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases. The technique can include dividing, at the server, the redundant set of the plurality of phrase pairs into two of more subsets based on a number of sub-phrases in each phrase pair of the redundant set of the plurality of phrase pairs, wherein each subset corresponds to a specific number of sub-phrases. The technique can include calculating, at the server, a first probability for each specific phrase pair of the redundant set of the plurality of phrase pairs, the first probability indicating a likelihood that its corresponding specific phrase pair is an appropriate translation. The technique can include calculating, at the server, a second probability for each specific phrase pair based on third probabilities of the sub-phrases of the specific phrase pair, the second and third probabilities each indicating a likelihood that a corresponding specific phrase pair or sub-phrase is an appropriate translation. The technique can include calculating, at the server, a frequency-weighted difference between a logarithm of the first probability and a logarithm of the second probability to obtain a value for each specific phrase pair. The technique can include comparing, at the server, the value for each specific phrase pair to a probability threshold indicative of an acceptable change in probability distribution of the phrase table. The technique can include selecting, at the server, each specific phrase pair when its corresponding value is less than the probability threshold to obtain the one or more selected phrase pairs, wherein the one or more selected phrase pairs for each subset of the redundant set of the plurality of phrase pairs are obtained sequentially from a subset corresponding to a lowest number of sub-phrases to a subset corresponding to a highest number of sub-phrases. The technique can also include removing, at the server, the one or more selected phrase pairs from the phrase table to obtain a modified phrase table.

Another computer-implemented technique is also presented. The technique can include receiving, at a server including one or more processors, a phrase table for statistical machine translation, the phrase table including a plurality of phrase pairs corresponding to one or more pairs of languages. The technique can include determining, at the server, a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases. The technique can include calculating, at the server, a first probability for each specific phrase pair of the redundant set of the plurality of phrase pairs, the first probability indicating a likelihood that its corresponding specific phrase pair is an appropriate translation. The technique can include calculating, at the server, a second probability for each specific phrase pair based on third probabilities of the sub-phrases of the specific phrase pair, the second and third probabilities each indicating a likelihood that a corresponding specific phrase pair or sub-phrase is an appropriate translation. The technique can include comparing, at the server, the first and second probabilities for each specific phrase pair to a probability threshold indicative of an acceptable change in probability distribution of the phrase table. The technique can include selecting, at the server, each specific phrase pair when its corresponding second probability is within the probability threshold from its corresponding first probability to obtain one or more selected phrase pairs. The technique can also include removing, at the server, the one or more selected phrase pairs from the phrase table to obtain a modified phrase table.

In some embodiments, the technique further includes dividing, at the server, the redundant set of the plurality of phrase pairs into two of more subsets based on a number of sub-phrases in each phrase pair of the redundant set of the plurality of phrase pairs, wherein each subset corresponds to a specific number of sub-phrases.

In other embodiments, the technique further includes obtaining, at the server, the one or more selected phrase pairs for each subset of the redundant set of the plurality of phrase pairs sequentially from a subset corresponding to a lowest number of sub-phrases to a subset corresponding to a highest number of sub-phrases.

In some embodiments, the highest number of sub-phrases in any phrase of any phrase pair of the phrase table is six.

In other embodiments, calculating the second probability for each specific phrase pair based on the third probabilities of the sub-phrases of the specific phrase pair includes calculating, at the server, a product of the third probabilities to obtain the second probability.

In some embodiments, the technique further includes generating, at the server, the phrase table based on an analysis of at least one parallel corpora, wherein the analysis of the at least one parallel corpora includes determining, at the server, a frequency for each phrase pair in the parallel corpora.

In other embodiments, the analysis of the at least one parallel corpora includes determining, at the server, a fourth probability for each phrase pair in the parallel corpora based on its frequency relative to other phrase pairs in the parallel corpora, wherein the first probability for a specific phrase pair in the redundant set equals its fourth probability, and wherein the second probability for the specific phrase pair is calculated based on the fourth probabilities for each of its sub-phrases.

In some embodiments, comparing the first and second probabilities for each specific phrase pair to the probability threshold and selecting each specific phrase pair when its corresponding second probability is within the probability threshold from its corresponding first probability to obtain the one or more selected phrase pairs includes: calculating, at the server, a frequency-weighted difference between a logarithm of the first probability and a logarithm of the second probability to obtain a value for each specific phrase pair, comparing, at the server, the value for each specific phrase pair to the probability threshold, and selecting, at the server, each specific phrase pair when its corresponding value is less than the probability threshold to obtain the one or more selected phrase pairs.

In other embodiments, the technique further includes determining, at the server, the probability threshold based on empirical testing.

In some embodiments, the technique further includes: receiving, at the server, one or more source words in a source language to be translated to a target language that is different than the source language, performing, at the server, statistical machine translation of the one or more source words in the source language to obtain one or more translated words in the target language using the modified phrase table, and outputting, at the server, the one or more translated words in the target language.

A server is also presented. The server can include a memory and one or more processors. The memory can be configured to store a phrase table for statistical machine translation, the phrase table including a plurality of phrase pairs corresponding to one or more pairs of languages. The one or more processors can be configured to: determine a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases, calculate a first probability for each specific phrase pair of the redundant set of the plurality of phrase pairs, the first probability indicating a likelihood that its corresponding specific phrase pair is an appropriate translation, calculate a second probability for each specific phrase pair based on third probabilities of the sub-phrases of the specific phrase pair, the second and third probabilities each indicating a likelihood that a corresponding specific phrase pair or sub-phrase is an appropriate translation, compare the first and second probabilities for each specific phrase pair to a probability threshold indicative of an acceptable change in probability distribution of the phrase table, select each specific phrase pair when its corresponding second probability is within the probability threshold from its corresponding first probability to obtain one or more selected phrase pairs, and remove the one or more selected phrase pairs from the phrase table to obtain a modified phrase table.

In some embodiments, the one or more processors are further configured to divide the redundant set of the plurality of phrase pairs into two of more subsets based on a number of sub-phrases in each phrase pair of the redundant set of the plurality of phrase pairs, wherein each subset corresponds to a specific number of sub-phrases.

In other embodiments, the one or more processors are further configured to obtain the one or more selected phrase pairs for each subset of the redundant set of the plurality of phrase pairs sequentially from a subset corresponding to a lowest number of sub-phrases to a subset corresponding to a highest number of sub-phrases.

In some embodiments, the one or more processors are configured to calculate the second probability for each specific phrase pair based on the third probabilities of the sub-phrases of the specific phrase pair by calculating a product of the third probabilities to obtain the second probability.

In other embodiments, the one or more processors are further configured to: generate the phrase table based on an analysis of at least one parallel corpora, wherein the analysis of the at least one parallel corpora includes determining, at the server, a frequency for each phrase pair in the parallel corpora, and store the phrase table in the memory.

In some embodiments, the one or more processors are configured to analyze the at least one parallel corpora by determining a fourth probability for each phrase pair in the parallel corpora based on its frequency relative to other phrase pairs in the parallel corpora, wherein the first probability for a specific phrase pair in the redundant set equals its fourth probability, and wherein the second probability for the specific phrase pair is calculated based on the fourth probabilities for each of its sub-phrases.

In other embodiments, the one or more processors are configured to compare the first and second probabilities for each specific phrase pair to the probability threshold and selecting each specific phrase pair when its corresponding second probability is within the probability threshold from its corresponding first probability to obtain the one or more selected phrase pairs by: calculating a frequency-weighted difference between a logarithm of the first probability and a logarithm of the second probability to obtain a value for each specific phrase pair, comparing the value for each specific phrase pair to the probability threshold, and selecting each specific phrase pair when its corresponding value is less than the probability threshold to obtain the one or more selected phrase pairs.

In some embodiments, the one or more processors are further configured to determine the probability threshold based on empirical testing.

In other embodiments, the server further includes a communication device configured to: receive one or more source words in a source language to be translated to a target language that is different than the source language, and output one or more translated words in the target language, wherein the one or more processors are further configured to perform statistical machine translation of the one or more source words in the source language to obtain the one or more translated words in the target language using the modified phrase table.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, phrase tables used for statistical machine translation can include a very large number of phrases, which can cause the phrase table to require a substantial amount of computing memory. The phrase tables, therefore, can be pruned. Pruning a phrase table may refer to removing phrase pairs from the phrase table or selecting a subset of the phrase table, thereby decreasing its size and the amount of computing memory required. For example, the phrase table may be pruned by removing unreliable phrase pairs or phrase pairs having low translation quality. Pruning unreliable or low-quality phrase pairs, however, can alter a probability distribution of the phrase table, which can affect translation performance.

Accordingly, techniques are presented for pruning phrase tables for statistical machine translation. The techniques can be referred to as entropy-based pruning, because the techniques provide for pruning of a phrase table while also maintaining a probability distribution of the pruned (modified) phrase table within a probability threshold from a probability distribution of the original phrase table. While the techniques for entropy-based pruning are described with respect to statistical machine translation, it should be appreciated that these techniques could also be applied to other suitable machine translation systems, e.g., hierarchical machine translation systems.

The techniques can generally provide for modified phrase tables requiring less computing memory and faster statistical machine translation using the modified phrase tables. The techniques can include determining a redundant set of phrase pairs from the plurality of phrase pairs and calculating first and second probabilities for each specific phrase pair of the redundant set. The second probability can be based on third probabilities for sub-phrases of each specific phrase pair. The techniques can then determine one or more selected phrase pairs based on whether a corresponding second probability for a specific phrase pair is within a probability threshold from its corresponding first probability.

The techniques can then remove the one or more selected phrase pairs from the phrase table to obtain a modified phrase table. While the techniques are described to look for a best segmentation, it should be appreciated that other criteria may also be used to obtain high quality estimates, e.g., distortion costs that penalize re-ordering. Further, in some implementations, the techniques include can pruning the phrase table sequentially from the shortest phrases (a smallest number of sub-phrases) to the longest phrases (a largest number of sub-phrases). The modified phrase table can then be used to perform statistical machine translation from a source language to a target language.

Figure 1:
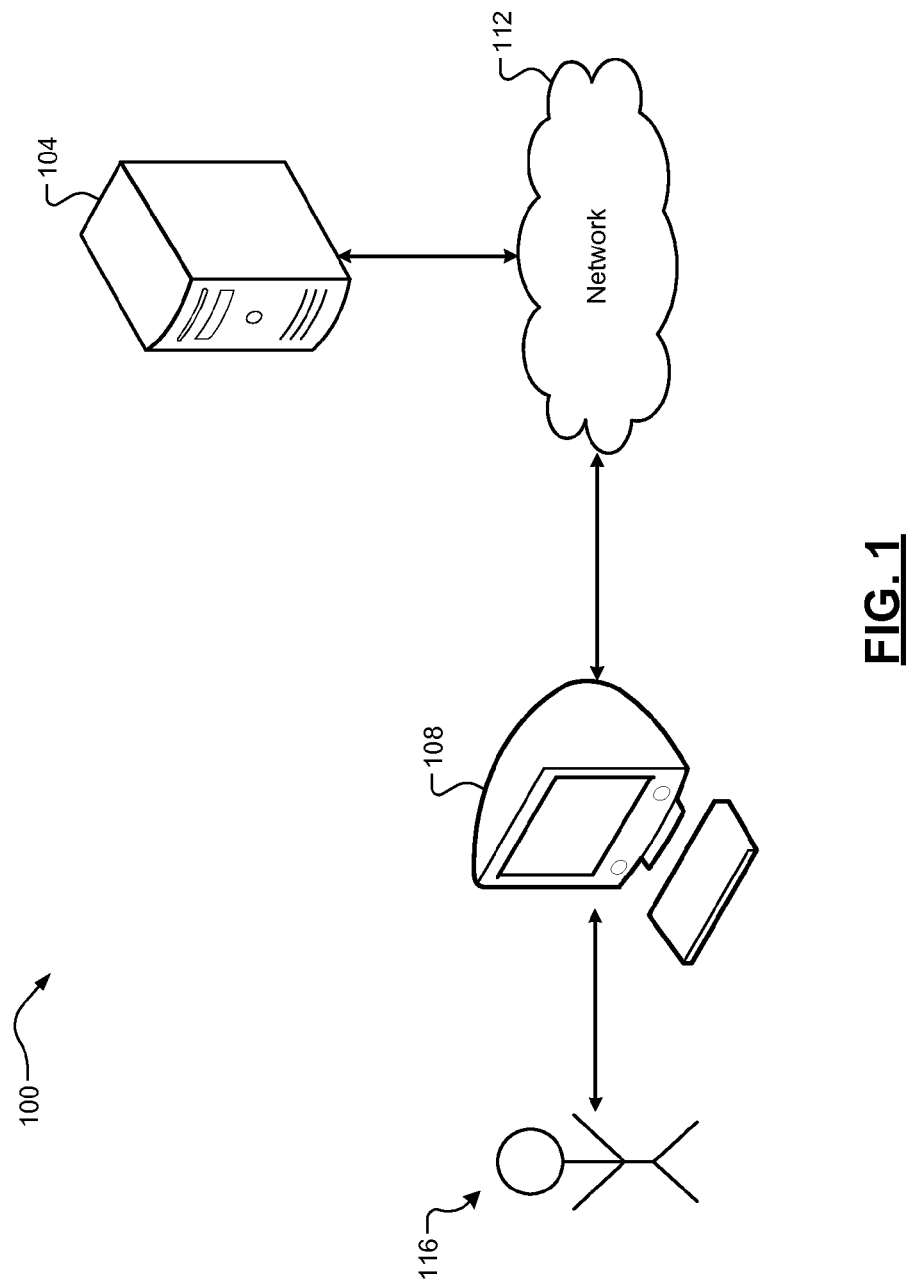
FIG. 1 is a diagram of a computing network including an example server according to some implementations of the present disclosure.

Referring now to FIG. 1, a computing network 100 is illustrated. The computing network 100 can include an example server 104 according to some implementations of the present disclosure. The server 104 can be any suitable computing device including one or more processors. It should be appreciated that while one server 104 is shown, the two or more servers can be implemented to operate in a parallel or distributed architecture. The server 104 can communicate with a computing device 108 via a network 112. The computing device 108 can be any suitable type of computing device, such as a desktop computer, a laptop computer, a tablet computer, or a mobile phone. The network 112 can include a local area network (LAN), a wide area network (WAN), e.g., the Internet, or a combination thereof.

The server 104 can perform statistical machine translation of one or more source words in a source language to obtain one or more translated words in a target language. The computing device 108 may provide the one or more source words to the server 104 via the network 112 and/or may receive the one or more translated words from the server 104 via the network 112. For example, the one or more source words may be input at the computing device 108 by a human user 116. The server 104 can perform the statistical machine translation of the one or more source words to obtain the one or more translated words using a modified phrase table that can be generated using the techniques of the present disclosure.

Figure 2:
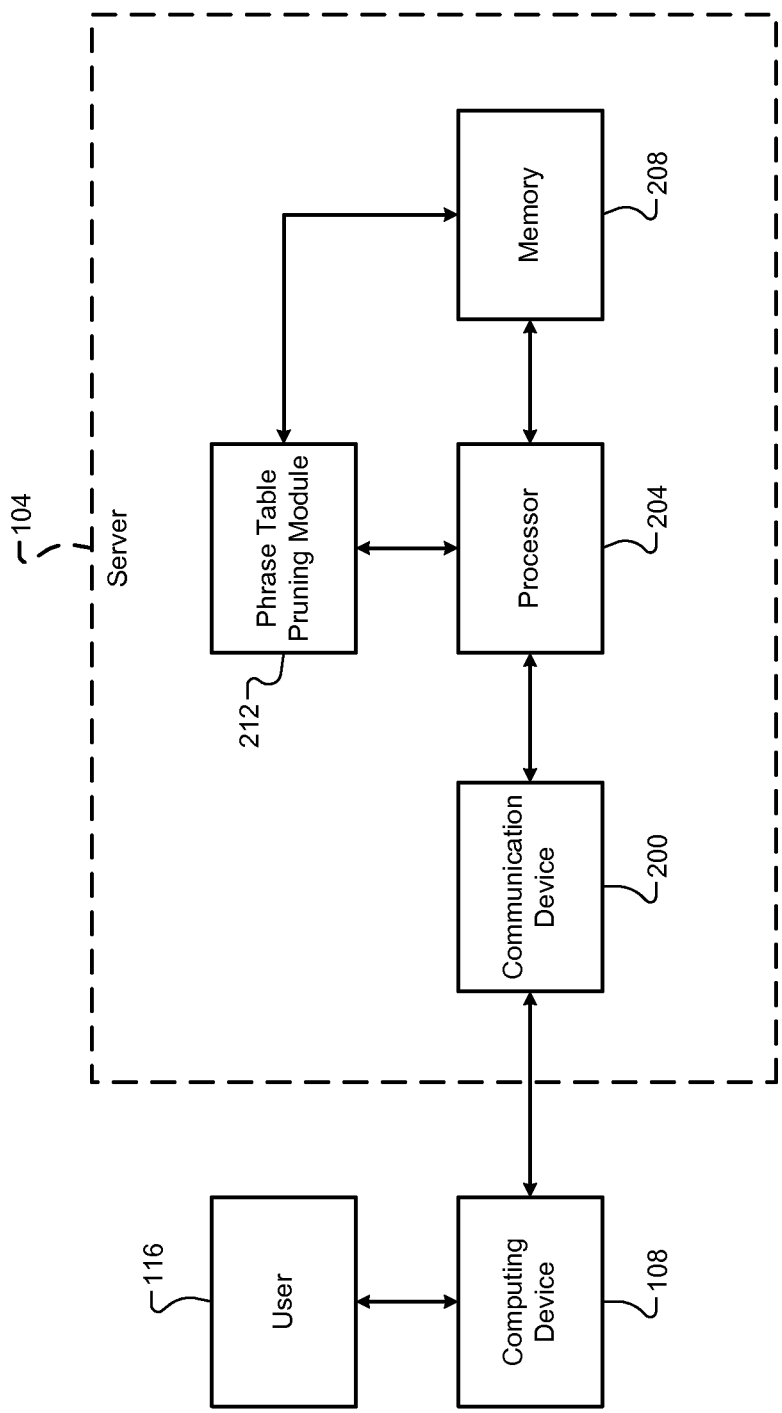
FIG. 2 is a functional block diagram of the example server of FIG. 1.

Referring now to FIG. 2, a functional block diagram of the example server 104 is illustrated. The server 104 can include a communication device 200, a processor 204, a memory 208, and a phrase table pruning module 212. It should be appreciated that the term "processor" as used herein can denote two or more processors operating in a parallel or distributed architecture. It should also be appreciated that the processor 204 can wholly or partially execute the phrase table pruning module 212.

The communication device 200 can be configured to transmit and receive data via the network 112. Specifically, the communication device 200 can receive the one or more source words in the source language and/or transmit the one or more translated words in the target language. The one or more source words may be received from and/or transmitted to the computing device 108. For example, the user 116 may input the one or more source words at the computing device 108 and, in response to a request, the server 104 may return the one or more translated words to the computing device 108 for the user 116. The communication device 200 can include any suitable communication components, such as a transceiver.

The processor 204 can control operation of the server 104. The processor 204 can execute functions including, but not limited to, loading and executing an operating system of the server 104, controlling communication via the communication device 200, and/or controlling storage/retrieval operations at the memory 208. The processor 204 can also execute the techniques of the present disclosure via the phrase table pruning module 212. The memory 208 can be any suitable type of storage medium (flash, hard disk, etc.) configured to store the phrase table for statistical machine translation. It should be appreciated, however, that the phrase table can be stored partially or entirely in an external datastore.

The phrase table pruning module 212 can prune the phrase table according to the techniques of the present disclosure to obtain the modified phrase table. For example only, the phrase table discussed herein is a French-to-English phrase table that can be used for statistical machine translation from French (the source language) to English (the target language). It should be appreciated, however, that the phrase table can include any other suitable pairs of languages. For example, when one of the languages is a logogram-based language, e.g., Chinese, or a syllabogram-based language, e.g., Japanese, pre-processing of the characters can be performed to obtain text that can be used by the techniques of the present disclosure. Furthermore, in some implementations the phrase table can include a plurality of phrase pairs for two or more different pairs of languages. The phrase table can be generated by analyzing parallel corpora, e.g., an original corpora in a first language and a translated corpora in a second language, to determine a frequency of each phrase pair in the parallel corpora. The frequency of each phrase pair can be used to determine a probability for each phrase pair relative to other phrase pairs in the parallel corpora.

The phrase table pruning module 212 can determine a redundant set of the plurality of phrase pairs. The redundant set of the plurality of phrase pairs can include each of the plurality of phrase pairs having a phrase that matches a phrase of another of the plurality of phrase pairs. For example, the French phrase "le gouvernement francais" can be part of two different phrase pairs: the English phrase "the French government" and the English phrase "the government of France." Each phrase of the plurality of phrase pairs can also include two or more sub-phrases. A sub-phrase can refer to one or more words of a phrase, but less than all of the words of the phrase. For example, the English phrase "the government of France" can include sub-phrases "the," "government," and "of France." Table 1 (below) illustrates a portion of the phrase table, which includes example statistics for the example phrases above:

| Source Phrase $\tilde{f}$ | Target Phase $\tilde{e}$ | N($\tilde{f}$, $\tilde{e}$) | p($\tilde{e}$ | $\tilde{f}$) |
|---|---|---|---|
| le | the | 7.6M | 0.7189 |
| gouvernement | government | 245K | 0.4106 |
| français | French | 51K | 0.6440 |
|  | of France | 695 | 0.0046 |
| le gouvernement français | the French government | 148 | 0.1686 |
|  | the government of France | 11 | 0.0128 | where $\tilde{f}$ represents a specific source phrase, $\tilde{e}$ represents a specific target phrase, N($\tilde{f}$, $\tilde{e}$) represents the frequency of a specific phrase pair ($\tilde{f}$, $\tilde{e}$) in the parallel corpora, p represents the probability of the phrase pair in the parallel corpora, K represents a unit of thousands, and M represents a unit of millions.

The phrase table pruning module 212 can prune an original phrase table p($\tilde{e}|\tilde{f}$) (also referred to as an original translation model) to obtain a pruned phrase table p'($\tilde{e}|\tilde{f}$) (also referred to as a pruned translation model). The original phrase table can be pruned to obtain a pruned phrase table that is as similar as possible to the original phrase table. For example, conditional Kullback-Liebler divergence (also known as conditional relative entropy) can be used to measure the similarity between the pruned phrase table and the original phrase table as follows:

$$D(p(\tilde{e}|\tilde{f}) \| p'(\tilde{e}|\tilde{f}),$$

$$= \sum_{\tilde{f}} p(\tilde{f}) \sum_{\tilde{e}} p(\tilde{e}|\tilde{f}) \log\left[\frac{p(\tilde{e}|\tilde{f})}{p'(\tilde{e}|\tilde{f})}\right], \quad (1)$$

$$\sum_{\tilde{f},\tilde{e}}^{\tilde{f}} p(\tilde{e},\tilde{f})[\log p(\tilde{e}|\tilde{f}) - \log p'(\tilde{e}|\tilde{f})]. \quad (2)$$

This equivalent approximation can be applied because computing the best pruned model for a given size would require optimizing over all subsets with that size, which may be computationally infeasible.

The phrase table pruning module 212 can calculate a first probability for each specific phrase pair of the redundant set of the plurality of phrase pairs. The first probability can indicate a likelihood that its corresponding specific phrase pair is an appropriate translation. The first probability for a specific phrase pair can be the probability associated with the specific phrase pair in the phrase table from the analysis of the parallel corpora. Referring again to Table 1, for example, the first probability for the phrase pair "le gouvernement francais" and "the government of France" is 0.0128, which is based on its 11 occurrences in the parallel corpora. Additionally, for example, the first probability for the phrase pair "le gouvernement francais" and "the French government" is 0.1686, which is based on its 148 occurrences in the parallel corpora.

The phrase table pruning module 212 can also calculate a second probability for each specific pair based on third probabilities of the sub-phrases of the specific phrase pair. Each third probability can indicate a likelihood that a specific sub-phrase of is an appropriate translation. The third probability for a specific sub-phrase can be the probability associated with the specific sub-phrase in the phrase table from the analysis of the parallel corpora. The phrase table pruning module 212 can calculate the second probability by calculating a product of the third probabilities for the sub-phrases. Referring again to Table 1, for example, the second probability for the phrase pair "le gouvernement francais" and "the government of France" is (0.7189)×(0.4106)×(0.0046), which equals 0.0014. Additionally, for example, the second probability for the phrase pair "le gouvernement francais" and "the French government" is (0.7189)×(0.4106)×(0.6440), which equals 0.1901.

The phrase table pruning module 212 can then compare the first and second probabilities for each specific phrase pair of the redundant set to determine which (if any) phrase pair(s) to select for removal from the phrase table. The phrase table pruning module 212 can compare the first and second probabilities for each specific phrase pair to a probability threshold $\tau_E$ to determine one or more selected phrase pairs. This probability threshold can also be referred to as a pruning threshold. The probability threshold can indicate an acceptable change in probability distribution of the phrase table. The change in probability distribution of the phrase table can also be referred to as a translation cost, because the change in the probability distribution can affect the translation performance using the phrase table. For example, the probability threshold can be determined based on empirical testing.

Phrase pairs having a contribution to the relative entropy below the probability threshold can be pruned. In other words, a phrase pair ($\tilde{f}$, $\tilde{e}$) can be pruned if:

$$p(\tilde{e},\tilde{f})[\log p(\tilde{e}|\tilde{f}) - \log p'(\tilde{e}|\tilde{f})] < \tau_E \quad (3).$$

This comparison, however, can also be frequency-weighted. In other words, more common/frequent phrases may be adjusted as little as possible, whereas rare/more infrequent phrases may be adjusted more without drastically affecting translation performance. When a frequency-weighted difference of a logarithm of the first probability and a logarithm of the second probability for a specific phrase pair is less than or equal to the probability threshold, the phrase table pruning module 212 can select the phrase pair to be pruned. Similarly, when the frequency-weighted difference of the logarithm of the first probability and the logarithm of the second probability is greater than or equal to the probability threshold, the phrase table pruning module 212 may not select the phrase pair to be pruned. Note that a difference between a logarithm of a first probability and a logarithm of a second probability equals a logarithm of a quotient of the first probability and the second probability.

For example only, the probability threshold may be one order of magnitude (zero). Referring again to Table 1, for example, the first and second probabilities for the phrase pair "le gouvernement francais" and "the government of France" are 0.0128 and 0.0014, respectively. The frequency-weighted difference of the logarithm of the second probability and the logarithm of the first probability would be: 11×[log(0.0128)−log(0.0014)]=10.572, which is greater than the probability threshold of zero. Therefore, the phrase table pruning module 212 does not select the phrase pair "le gouvernement francais" and "the government of France" for removal from the phrase table because the resulting change in the probability distribution is greater than acceptable.

Additionally, as previously described, the first and second probabilities for the phrase pair "le gouvernement francais" and "the French government" are 0.1686 and 0.1901, respectively. The frequency-weighted difference between the logarithm of the first probability and the logarithm of the second probability would be: 148×[log(0.1686)−log(0.1901)]=−7.714, which is less than the probability threshold of zero. Therefore, the phrase table pruning module 212 does select the phrase pair "le gouvernement francais" and "the French government" for removal from the phrase table because the resulting change in the probability distribution is relatively minor.

The phrase table pruning module 212 can assign probabilities p'(ẽ|f̃) under the pruned translation model as follows. First, the phrase table pruning module 212 can select among different segmentations of the source language sentence into phrases. If a segmentation into longer phrases does not exist, the phrase table pruning module 212 can compose a translation out of shorter phrases. Thus, if a phrase pair (f̃, ẽ) is no longer available, the phrase table pruning module 212 can use shorter phrases to produce the same translation. Therefore, the pruned translation model score p'(ẽ|f̃) can be decomposed by summing over all segmentations $s_1^K$ and all re-orderings $\pi_1^K$ as follows:

$$p'(\tilde{e} \mid \tilde{f}) = \sum_{s_1^K, \pi_1^K} p(s_1^K, \pi_1^K \mid \tilde{f}) \cdot p(\tilde{e} \mid s_1^K, \pi_1^K, \tilde{f}), \quad (4)$$

where K represents a number of sub-phrases, $s_1^K$ represents a specific segmentation that divides both a specific source phrase f̃ and a specific target phrase ẽ into K sub-phrase, and $\pi_1^K$ represents a permutation that describes an alignment of the K sub-phrases such that a specific sub-phrase $\bar{e}_{\pi_K}$ is aligned to a specific sub-phrase $\bar{f}_{\pi_K}$.

The original phrase translation model can then be used to obtain:

$$p'(\tilde{e} \mid \tilde{f}) = \sum_{s_1^K, \pi_1^K} p(s_1^K, \pi_1^K \mid \tilde{f}) \prod_{k=1}^{K} p(\bar{e}_k \mid \bar{f}_{\pi_K}). \quad (5)$$

Phrase-based decoders, however, can use a maximum-approximation. In other words, the sum of Equation 5 can be replaced with a maximum as follows:

$$p'(\tilde{e} \mid \tilde{f}) \approx \max_{s_1^K, \pi_1^K} \prod_{k=1}^{K} p(\bar{e}_k \mid \bar{f}_{\pi_K}). \quad (6)$$

Note that the segmentation probability has been dropped because it may not be used for decoding. The resulting pruning criterion is a function of only the original translation model p(ẽ|f̃) as stored in the phrase table. As such, there is no need to a special development or an adaptation set. Therefore, the best segmentation can be determined using dynamic programming, similar to decoding with a phrase-based model (however, the target side is constrained here to the given phrase ẽ.

In some cases, a phrase may not be compositional. In other words, the phrase table pruning module 212 may be unable to find a segmentation into shorter phrases. In such cases, a small, constant probability can be assigned as follows:

$$p'(\tilde{e}|\tilde{f}) = p_c \quad (7),$$

where $p_c$ represents the small, constant probability. For example only, the value $p_c = e^{-10}$ works well for many languages pairs.

After selecting one or more of the phrase pairs from the set of redundant phrases as described above to obtain the one or more selected phrase pairs, the phrase table pruning module 212 can remove the one or more selected phrase pairs from the phrase table to obtain the modified phrase table. The server 104 can then use the modified phrase table to perform statistical machine translation. Specifically, the server 104 can receive one or more source words in a source language, e.g., French, perform statistical machine translation of the one or more source words using the modified phrase table to obtain one or more translated words in a target language, e.g., English, and then output the one or more translated words.

In some implementations, the phrase table pruning module 212 can remove phrase pair(s) from the phrase table by beginning with the shortest phrases (a smallest number of words or sub-phrases) and concluding with the longest phrases (a largest number of words or sub-phrases). For example, the phrase table may be limited to phrases having a maximum of six words. By pruning the phrase table sequentially from the shortest phrases (a smallest number of sub-phrases) to the longest phrases (a largest number of sub-phrases), the phrase table pruning module 212 can avoid a situation where sub-phrases previously being in place of a removed phrase pair are subsequently removed themselves. Computing the entropy criterion once for the entire phrase table can also allow for varying the probability threshold without having to re-compute the entire phrase table.

The phrase table pruning module 212 can divide the redundant set of the plurality of phrase pairs into two of more subsets based on a number of sub-phrases in each phrase pair of the redundant set of the plurality of phrase pairs, where each subset corresponds to a specific number of sub-phrases.

The phrase table pruning module 212 can then obtain the one or more selected phrase pairs for each subset of the redundant set of the plurality of phrase pairs (as previously described herein) sequentially from a subset corresponding to a lowest number of sub-phrases, e.g., two, to a subset corresponding to a highest number of sub-phrases, e.g., six.

Figure 3:
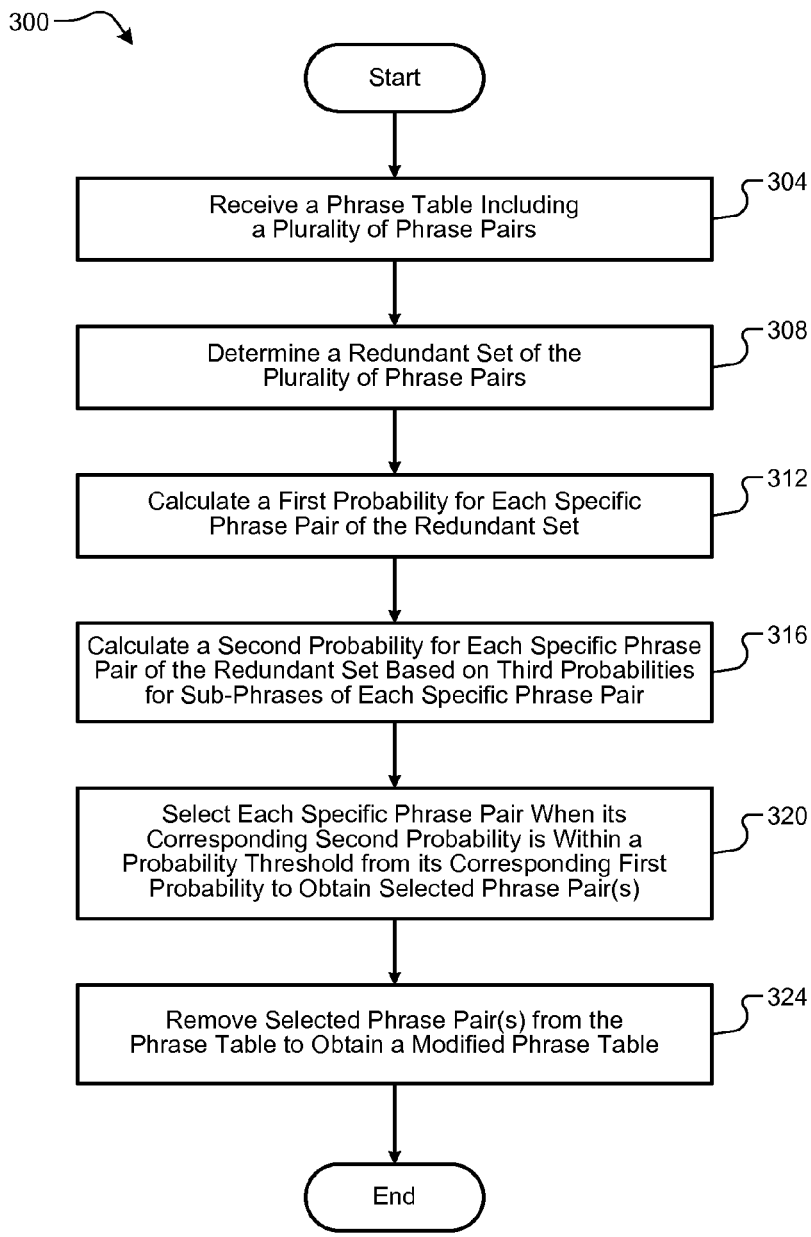
FIG. 3 is a flow diagram of an example technique for pruning of phrase tables for statistical machine translation according to some implementations of the present disclosure.

Referring now to FIG. 3, a flow diagram of an example technique 300 for pruning phrase tables for statistical machine translation is illustrated. At 304, the server 104 can receive a phrase table for statistical machine translation. The phrase table can include a plurality of phrase pairs corresponding to one or more pairs of languages. At 308, the server 104 can determine a redundant set of the plurality of phrase pairs. The redundant set of the plurality of phrase pairs can include each of the plurality of phrase pairs having a phrase matching a phrase of another of the plurality of phrase pairs. Each phrase of the plurality of phrase pairs can include two or more sub-phrases.

At 312, the server 104 can calculate a first probability for each specific phrase pair of the redundant set of the plurality of phrase pairs. The first probability can indicate a likelihood that its corresponding specific phrase pair is an appropriate translation. At 316, the server 104 can calculate a second probability for each specific phrase pair based on third probabilities of the sub-phrases of the specific phrase pair. The second and third probabilities can each indicate a likelihood that their corresponding specific phrase pair or sub-phrase is an appropriate translation.

At 320, the server 104 can compare the first and second probabilities for each specific phrase pair to a probability threshold indicative of an acceptable change in probability distribution of the phrase table. The server 104 can select each specific phrase pair when its corresponding second probability is within the probability threshold from its corresponding first probability to obtain one or more selected phrase pairs. At 324, the server 104 can remove the one or more selected phrase pairs from the phrase table to obtain a modified phrase table. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a server including one or more processors, a phrase table for statistical machine translation, the phrase table including a plurality of phrase pairs corresponding to one or more pairs of languages;
determining, at the server, a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases;
dividing, at the server, the redundant set of the plurality of phrase pairs into two or more subsets based on a number of sub-phrases in each phrase pair of the redundant set of the plurality of phrase pairs, wherein each subset corresponds to a specific number of sub-phrases;
calculating, at the server, a first probability for each specific phrase pair of the redundant set of the plurality of phrase pairs, the first probability indicating a likelihood that its corresponding specific phrase pair is an appropriate translation;
calculating, at the server, a second probability for each specific phrase pair based on third probabilities of the sub-phrases of the specific phrase pair, the second and third probabilities each indicating a likelihood that a corresponding specific phrase pair or sub-phrase is an appropriate translation;
calculating, at the server, a frequency-weighted difference between a logarithm of the first probability and a logarithm of the second probability to obtain a value for each specific phrase pair;
comparing, at the server, the value for each specific phrase pair to a probability threshold indicative of an acceptable change in probability distribution of the phrase table;
selecting, at the server, each specific phrase pair when its corresponding value is less than the probability threshold to obtain the one or more selected phrase pairs, wherein the one or more selected phrase pairs for each subset of the redundant set of the plurality of phrase pairs are obtained sequentially from a subset corresponding to a lowest number of sub-phrases to a subset corresponding to a highest number of sub-phrases; and
removing, at the server, the one or more selected phrase pairs from the phrase table to obtain a modified phrase table.

2. A computer-implemented method, comprising:
receiving, at a server including one or more processors, a phrase table for statistical machine translation, the phrase table including a plurality of phrase pairs corresponding to one or more pairs of languages;
determining, at the server, a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases;
calculating, at the server, a first probability for each specific phrase pair of the redundant set of the plurality of phrase pairs, the first probability indicating a likelihood that its corresponding specific phrase pair is an appropriate translation;
calculating, at the server, a second probability for each specific phrase pair based on third probabilities of the sub-phrases of the specific phrase pair, the second and third probabilities each indicating a likelihood that a corresponding specific phrase pair or sub-phrase is an appropriate translation;
comparing, at the server, the first and second probabilities for each specific phrase pair to a probability threshold indicative of an acceptable change in probability distribution of the phrase table;
selecting, at the server, each specific phrase pair when its corresponding second probability is within the probability threshold from its corresponding first probability to obtain one or more selected phrase pairs; and removing, at the server, the one or more selected phrase pairs from the phrase table to obtain a modified phrase table.

3. The computer-implemented method of claim 2, further comprising dividing, at the server, the redundant set of the plurality of phrase pairs into two of more subsets based on a number of sub-phrases in each phrase pair of the redundant set of the plurality of phrase pairs, wherein each subset corresponds to a specific number of sub-phrases.

4. The computer-implemented method of claim 3, further comprising obtaining, at the server, the one or more selected phrase pairs for each subset of the redundant set of the plurality of phrase pairs sequentially from a subset corresponding to a lowest number of sub-phrases to a subset corresponding to a highest number of sub-phrases.

5. The computer-implemented method of claim 4, wherein the highest number of sub-phrases in any phrase of any phrase pair of the phrase table is six.

6. The computer-implemented method of claim 2, wherein calculating the second probability for each specific phrase pair based on the third probabilities of the sub-phrases of the specific phrase pair includes calculating, at the server, a product of the third probabilities to obtain the second probability.

7. The computer-implemented method of claim 2, further comprising generating, at the server, the phrase table based on an analysis of at least one parallel corpora, wherein the analysis of the at least one parallel corpora includes determining, at the server, a frequency for each phrase pair in the parallel corpora.

8. The computer-implemented method of claim 7, wherein the analysis of the at least one parallel corpora includes determining, at the server, a fourth probability for each phrase pair in the parallel corpora based on its frequency relative to other phrase pairs in the parallel corpora, wherein the first probability for a specific phrase pair in the redundant set equals its fourth probability, and wherein the second probability for the specific phrase pair is calculated based on the fourth probabilities for each of its sub-phrases.

9. The computer-implemented method of claim 8, wherein comparing the first and second probabilities for each specific phrase pair to the probability threshold and selecting each specific phrase pair when its corresponding second probability is within the probability threshold from its corresponding first probability to obtain the one or more selected phrase pairs includes:
calculating, at the server, a frequency-weighted difference between a logarithm of the first probability and a logarithm of the second probability to obtain a value for each specific phrase pair,
comparing, at the server, the value for each specific phrase pair to the probability threshold, and
selecting, at the server, each specific phrase pair when its corresponding value is less than the probability threshold to obtain the one or more selected phrase pairs.

10. The computer-implemented method of claim 2, further comprising determining, at the server, the probability threshold based on empirical testing.

11. The computer-implemented method of claim 2, further comprising:
receiving, at the server, one or more source words in a source language to be translated to a target language that is different than the source language;
performing, at the server, statistical machine translation of the one or more source words in the source language to obtain one or more translated words in the target language using the modified phrase table; and
outputting, at the server, the one or more translated words in the target language.

12. A server, comprising:
a memory configured to store a phrase table for statistical machine translation, the phrase table including a plurality of phrase pairs corresponding to one or more pairs of languages; and
one or more processors configured to:
determine a redundant set of the plurality of phrase pairs, the redundant set of the plurality of phrase pairs including each of the plurality of phrase pairs having a phrase matching a phrase of another of the plurality of phrase pairs, wherein each phrase of the plurality of phrase pairs includes two or more sub-phrases,
calculate a first probability for each specific phrase pair of the redundant set of the plurality of phrase pairs, the first probability indicating a likelihood that its corresponding specific phrase pair is an appropriate translation,
calculate a second probability for each specific phrase pair based on third probabilities of the sub-phrases of the specific phrase pair, the second and third probabilities each indicating a likelihood that a corresponding specific phrase pair or sub-phrase is an appropriate translation,
compare the first and second probabilities for each specific phrase pair to a probability threshold indicative of an acceptable change in probability distribution of the phrase table,
select each specific phrase pair when its corresponding second probability is within the probability threshold from its corresponding first probability to obtain one or more selected phrase pairs, and
remove the one or more selected phrase pairs from the phrase table to obtain a modified phrase table.

13. The server of claim 12, wherein the one or more processors are further configured to divide the redundant set of the plurality of phrase pairs into two of more subsets based on a number of sub-phrases in each phrase pair of the redundant set of the plurality of phrase pairs, wherein each subset corresponds to a specific number of sub-phrases.

14. The server of claim 13, wherein the one or more processors are further configured to obtain the one or more selected phrase pairs for each subset of the redundant set of the plurality of phrase pairs sequentially from a subset corresponding to a lowest number of sub-phrases to a subset corresponding to a highest number of sub-phrases.

15. The server of claim 12, wherein the one or more processors are configured to calculate the second probability for each specific phrase pair based on the third probabilities of the sub-phrases of the specific phrase pair by calculating a product of the third probabilities to obtain the second probability.

16. The server of claim 12, wherein the one or more processors are further configured to:
generate the phrase table based on an analysis of at least one parallel corpora, wherein the analysis of the at least one parallel corpora includes determining, at the server, a frequency for each phrase pair in the parallel corpora; and
store the phrase table in the memory.

17. The server of claim 16, wherein the one or more processors are configured to analyze the at least one parallel corpora by determining a fourth probability for each phrase pair in the parallel corpora based on its frequency relative to other phrase pairs in the parallel corpora, wherein the first probability for a specific phrase pair in the redundant set equals its fourth probability, and wherein the second probability for the specific phrase pair is calculated based on the fourth probabilities for each of its sub-phrases.

18. The server of claim 17, wherein the one or more processors are configured to compare the first and second probabilities for each specific phrase pair to the probability threshold and selecting each specific phrase pair when its corresponding second probability is within the probability threshold from its corresponding first probability to obtain the one or more selected phrase pairs by:
  calculating a frequency-weighted difference between a logarithm of the first probability and a logarithm of the second probability to obtain a value for each specific phrase pair,
  comparing the value for each specific phrase pair to the probability threshold, and
  selecting each specific phrase pair when its corresponding value is less than the probability threshold to obtain the one or more selected phrase pairs.

19. The server of claim 12, wherein the one or more processors are further configured to determine the probability threshold based on empirical testing.

20. The server of claim 12, further comprising:
  a communication device configured to:
    receive one or more source words in a source language to be translated to a target language that is different than the source language, and
    output one or more translated words in the target language,
  wherein the one or more processors are further configured to perform statistical machine translation of the one or more source words in the source language to obtain the one or more translated words in the target language using the modified phrase table.

* * * * *